(12) United States Patent
Kim

(10) Patent No.: US 10,303,595 B2
(45) Date of Patent: May 28, 2019

(54) APPARATUS AND METHOD FOR DYNAMICALLY MANAGING MEMORY

(71) Applicant: ELECTRONICS AND TELECOMMUNICATIONS RESEARCH INSTITUTE, Daejeon (KR)

(72) Inventor: Ik Soon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/641,028

(22) Filed: Jul. 3, 2017

(65) Prior Publication Data

US 2018/0011786 A1  Jan. 11, 2018

(30) Foreign Application Priority Data

Jul. 5, 2016 (KR) .................. 10-2016-0084828

(51) Int. Cl.
*G06F 12/02* (2006.01)
*G06F 12/06* (2006.01)

(52) U.S. Cl.
CPC ........ *G06F 12/023* (2013.01); *G06F 12/0207* (2013.01); *G06F 12/0292* (2013.01); *G06F 12/0653* (2013.01); *G06F 2212/1044* (2013.01)

(58) Field of Classification Search
CPC .......... G06F 12/023; G06F 2212/1044; G06F 12/0653; G06F 12/0292; G06F 12/0207
USPC ......................................................... 711/170
See application file for complete search history.

(56) References Cited

U.S. PATENT DOCUMENTS

| 6,499,644 B2 | 9/2002 | Honary et al. |
| 2008/0270710 A1 | 10/2008 | Kwon et al. |
| 2009/0204784 A1* | 8/2009 | Favergeon-Borgialli ................... G06F 12/0207 711/203 |
| 2015/0006806 A1 | 1/2015 | Kwon et al. |

FOREIGN PATENT DOCUMENTS

KR  2002-0056970 A  7/2002

* cited by examiner

*Primary Examiner* — Hua J Song

(57) ABSTRACT

The present invention relates to a dynamic memory management method which includes generating an N-dimensional memory address space in which coordinates are in a range of N natural numbers, the sum of which is the number of bits; and mapping a predetermined linear memory address region to an address region in the N-dimensional memory address space.

8 Claims, 5 Drawing Sheets

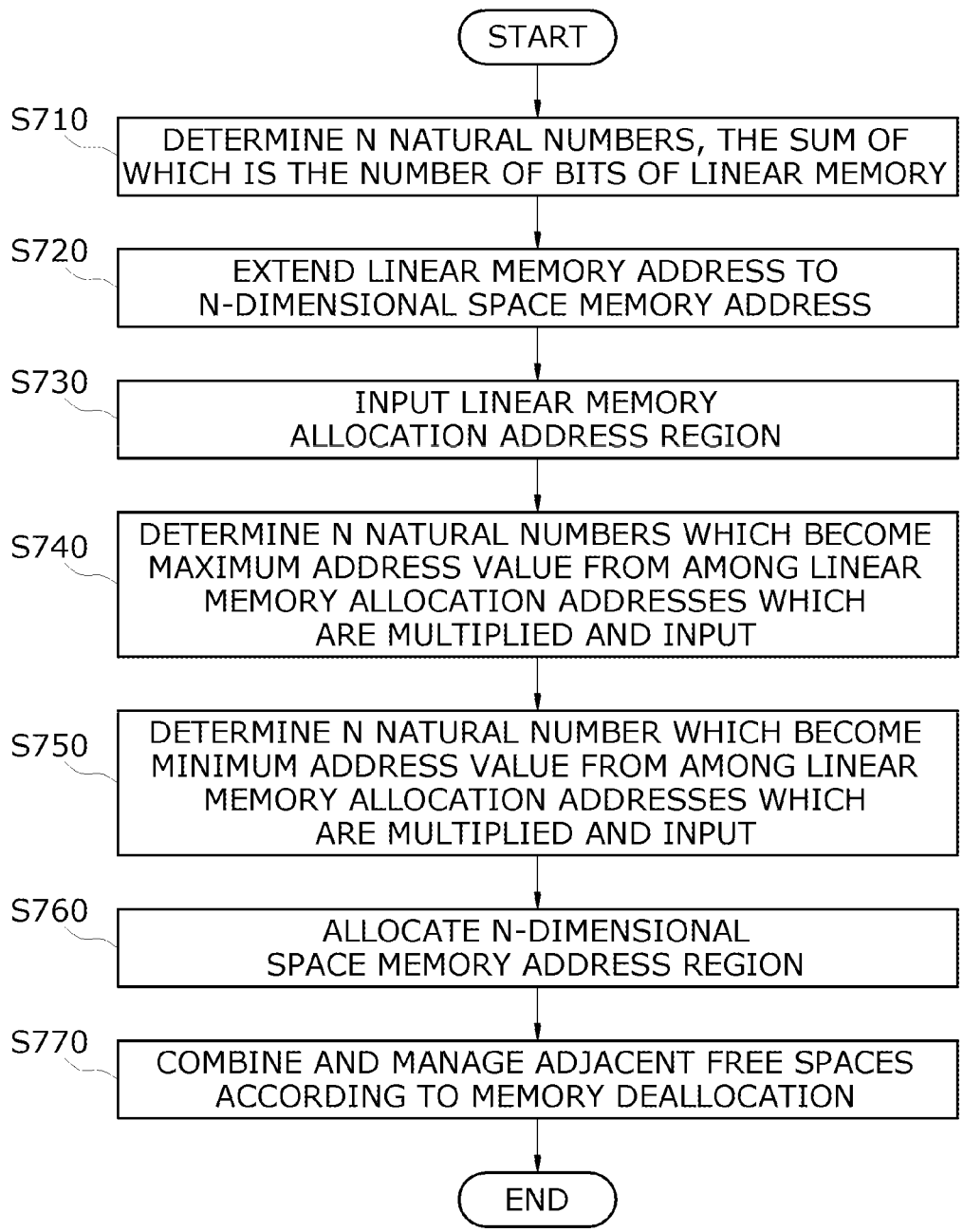

APPARATUS AND METHOD FOR DYNAMICALLY MANAGING MEMORY

CROSS-REFERENCE TO RELATED APPLICATION

This application claims priority to and the benefit of Korean Patent Application No. 10-2016-0084828, filed on Jul. 5, 2016, the disclosure of which is incorporated herein by reference in its entirety.

BACKGROUND

1. Field of the Invention

The present invention relates to a memory, and particularly, to an apparatus and method for dynamically managing a memory.

2. Discussion of Related Art

When data of a variable size, such as a string, is frequently created and deleted while executing a computer program, a memory fragmentation problem can occur. The memory fragmentation problem is a problem in which a usable memory space cannot be secured due to an erroneous arrangement of data on the memory even though there is actually a useful memory space. Memory fragmentation reduces efficiency of memory usage on a system and causes problems, such as insufficient memory.

Although a conventional dynamic memory provides various dynamic memory arrangement methods, such as first-fit, best-fit, and buddy algorithms, these methods arrange data of variable sizes on a one-dimensional array and have many limitations when combining unused free spaces.

SUMMARY OF THE INVENTION

The present invention provides an apparatus and method for dynamically managing a memory capable of reducing memory fragmentation that may occur when data of a variable size, such as a string and a frame buffer, is created and deleted.

In one general aspect, there is provided a dynamic memory management method including: generating an N-dimensional memory address space in a predetermined memory; and mapping a predetermined linear memory address region to an address region in the N-dimensional memory address space according to a memory allocation request.

The generating of the N-dimensional memory address space may include generating an N-dimensional memory address space in which coordinates are in a range of N natural numbers, the sum of which is the number of bits of a linear memory.

The mapping of the predetermined linear memory address region may include converting addresses of the predetermined linear memory address region to spatial memory addresses and mapping the predetermined linear memory address region to a space region in a range of the converted spatial memory addresses.

The mapping of the predetermined linear memory address region may include converting a minimum value address and a maximum value address of the predetermined linear memory address region to spatial memory addresses and mapping the predetermined linear memory address region to a space region ranging from the spatial memory address converted from the minimum value address to the spatial memory address converted from the maximum value address.

The converting of the addresses may include mapping a coordinate value consisting of N natural numbers, which are multiplied to become the linear memory address, to a spatial memory address in an N-dimensional space.

The dynamic memory management method may further include managing regions adjacent to an allocated spatial memory address region by combining the regions into free spaces when memory deallocation is performed.

In another general aspect, there is provided a dynamic memory management apparatus including: a memory address space generator configured to generate an N-dimensional memory address space in a predetermined memory; and a memory allocator configured to map a predetermined linear memory address region to an address region in the N-dimensional memory address space according to a memory allocation request.

The memory address space generator may generate the N-dimensional memory address space in which coordinates are in a range of N natural numbers, the sum of which is the number of bits of a linear memory.

The memory allocator may include an address converter configured to convert addresses of the predetermined linear memory address region to spatial memory addresses, and a region mapper configured to map the predetermined linear memory address region to a space region in a range of the converted spatial memory addresses.

The memory allocator may include an address converter configured to convert a minimum value address and a maximum value address of the predetermined linear memory address region to spatial memory addresses, and a region mapper configured to map the predetermined linear memory address region to a space region ranging from the spatial memory address converted from the minimum value address to the spatial memory address converted from the maximum value address.

The address converter may map coordinate values consisting of N natural numbers, which are multiplied to become the linear memory address to a spatial memory address in an N-dimensional space.

The dynamic memory management apparatus may further include a memory deallocator configured to manage regions adjacent to an allocated spatial memory address region by combining the regions into free spaces when memory deallocation is performed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a flowchart for describing a dynamic memory management method according to one embodiment of the present invention.

DETAILED DESCRIPTION OF EXEMPLARY EMBODIMENTS

Hereinafter, in order to facilitate understanding and reproduction of the present invention by those skilled in the art, the present invention will be described in detail by explaining exemplary embodiments with reference to the accompanying drawings.

When it is determined that detailed explanations of related well-known functions or configurations unnecessarily obscure the gist of the embodiments, the detailed explanations will be omitted.

Terms used throughout the specification are defined in consideration of functions according to the exemplary embodiments, and meanings thereof may vary depending on a user or operator's intentions or customs. Therefore, definitions of the terms should be made on the basis of the overall context.

Figure 1:
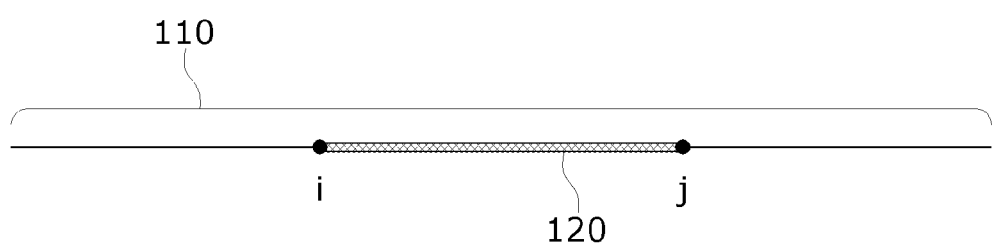
FIG. 1 is a memory model structure diagram based on a one-dimensional (1D) linear model.

FIG. 1 is a memory model structure diagram based on a one-dimensional (1D) linear model.

Referring to FIG. 1, content in units of bytes may be generally stored in an M-bit linear memory address region 110 in a 1D linear memory. Thus, as shown in the following Equation 1, content w, which is stored as a linear memory value (MEMone(addr)) for an address (addr) within M bits, is provided.

$$MEMone(addr)=w \qquad \text{<Equation 1>}$$

In Equation 1, addr is a natural number smaller than or equal to M bits.

In addition, FIG. 1 shows a memory region 120 (REGone (i~j)) from a linear memory address i to a linear memory address j in the memory model.

Figure 2:
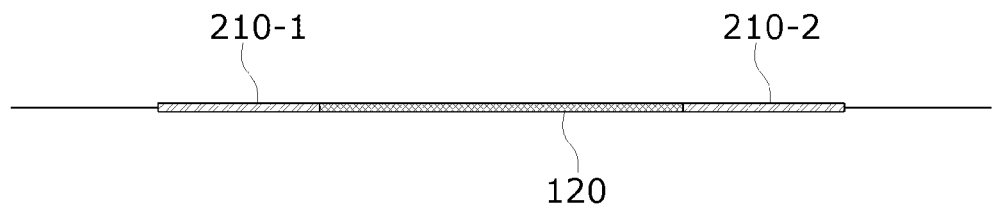
FIG. 2 is a diagram illustrating free spaces at a time of linear memory deallocation.

FIG. 2 is a diagram illustrating free spaces at a time of linear memory deallocation.

Referring to FIG. 2, when the use of a specific memory region 120 is cancelled in a linear address region, the memory region 120 is managed by being combined with unused adjacent memory regions 210-1 and 210-2 to be prepared for the next required memory allocation. The regions to be combined are referred to as free spaces. As in free spaces which may be combined in the linear address region, only adjacent regions (preceding and following regions) in an address space may be combined with the memory region so that actual regions that may be combined are limited.

Therefore, in the case in which a memory region of a specific size is allocated in a memory model based on a 1D address space, a memory may be allocated when a free space with a size greater than required is present among combined free space regions, and the possibility of allocating a new memory space is also limited.

Thus, the present invention suggests an apparatus and method for extending a conventional linear memory address to a memory address space in 2 or more dimensions. In other words, a linear address space is regarded as a multi-dimensional address space in 2 or more dimensions, and then allocation is performed.

First, a two-dimensional (2D) memory address space will be described as an example to assist understanding of the present invention.

Figure 3:
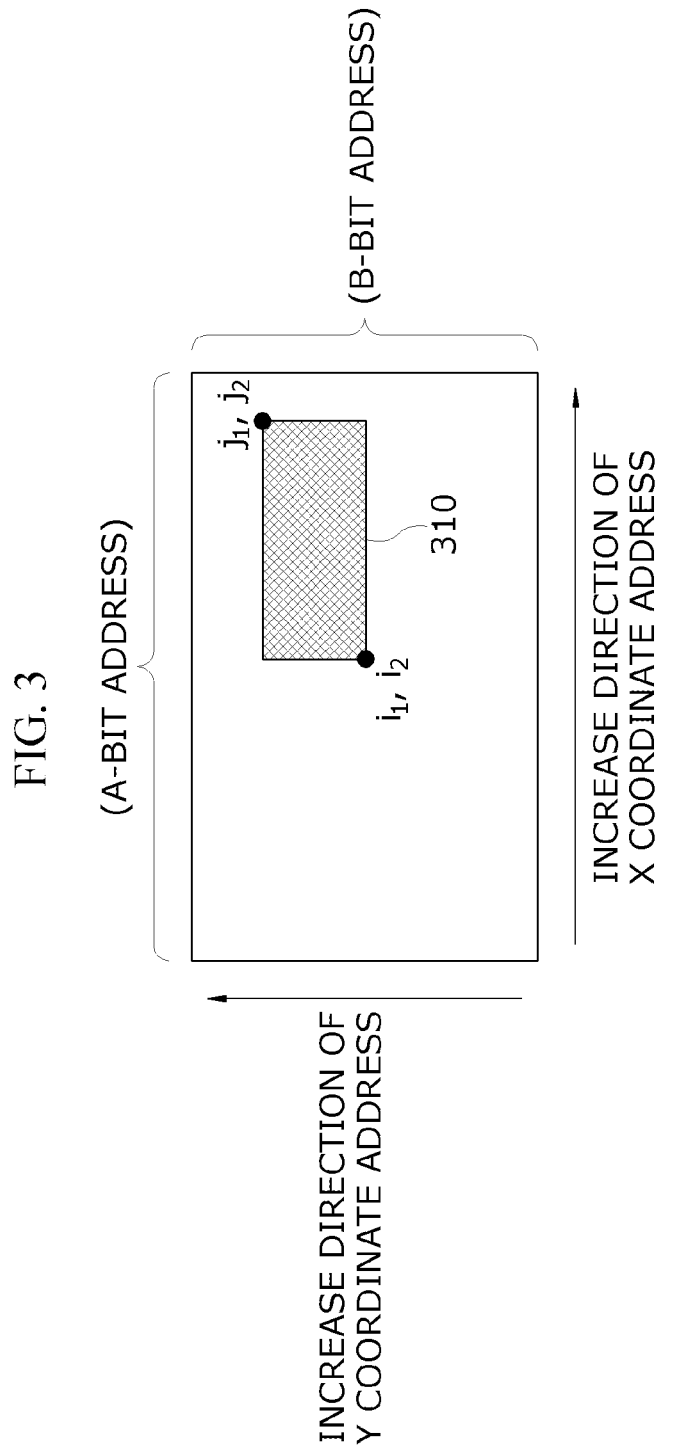
FIG. 3 is a diagram illustrating an example of a two-dimensional (2D) memory address space according to the present invention.

FIG. 3 is a diagram illustrating an example of a 2D memory address space according to the present invention.

Referring to FIG. 3, a linear memory address of M bits may extend to a 2D memory address space having an address range of A bits in an X coordinate direction and an address range of B bits in a Y coordinate direction. Here, A and B may be two natural numbers which satisfy an equation of "M=A+B."

The linear memory address is mapped within the 2D memory address space, wherein a linear memory address that is a natural number smaller than or equal to M may be converted into coordinates (x and y) in the 2D memory address space, by the following Equation 2. Here, x may be a natural number smaller than or equal to A, and y may be a natural number smaller than or equal to B.

$$MEMone(i1i2)=MEMtwo(j1,ji2) \qquad \text{<Equation 2>}$$

In Equation 2, i1 and j1 are natural numbers smaller than or equal to A bits, and i2 and j2 are natural numbers smaller than or equal to B bits.

In other words, the linear memory address may be converted into a 2D memory address having 2D spatial coordinates consisting of two natural numbers, i1 and i2, which are multiplied to become a value of the linear memory address.

When the linear memory address is converted into a 2D memory address in the above-described manner, a predetermined linear memory address region corresponds to a 2D memory address region 310 shown in FIG. 3 using the following Equation 3.

$$REGone(i\sim j)=REGtwo((i1,i2)\sim (j1,j2)) \qquad \text{<Equation 3>}$$

In Equation 3, i1 and j1 are natural numbers smaller than or equal to A bits, and i2 and j2 are natural numbers smaller than or equal to B bits.

Figure 4:
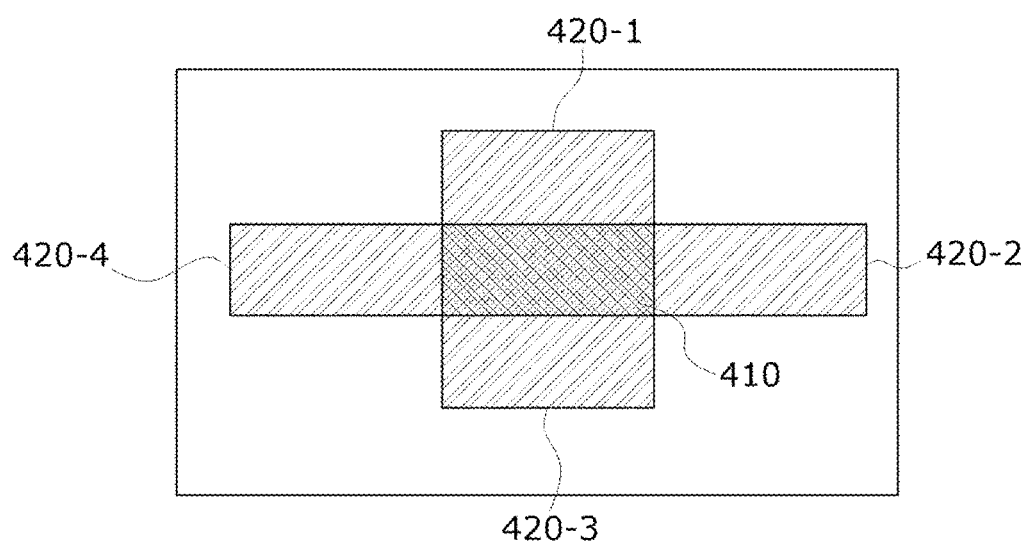
FIG. 4 is a diagram illustrating an example of free spaces at a time of deallocation in the 2D memory address space according to the present invention.

FIG. 4 is a diagram illustrating an example of free spaces at a time of deallocation in the 2D memory address space according to the present invention.

Referring to FIG. 4, when a 2D memory address region 410, which corresponds to a linear memory address region, is allocated and then a memory is deallocated, free spaces 420-1, 420-2, 420-3, and 420-4 adjacent to the allocated 2D memory address region 410 are combined. In comparison to the linear memory address model of FIG. 2, the memory address region is combined with a larger variety of free spaces.

Figure 5:
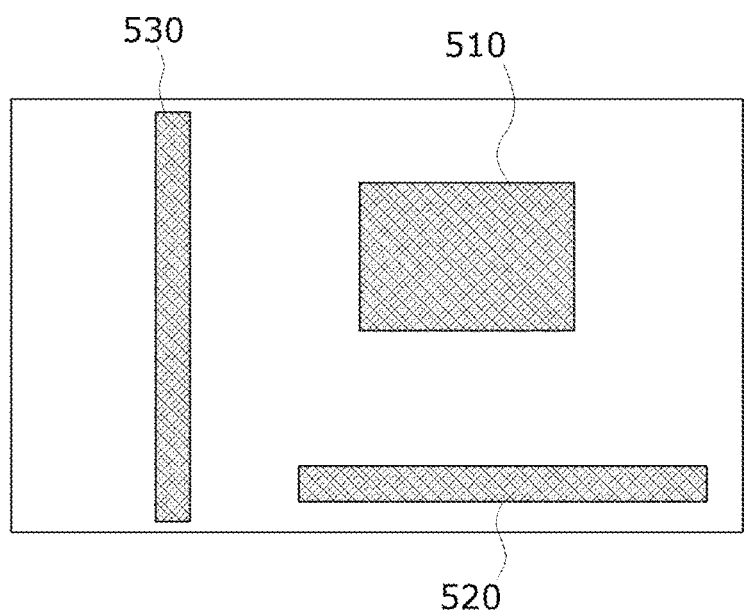
FIG. 5 is a diagram illustrating various examples in which a linear memory address region is converted into one of 2D memory address regions according to the present invention.

FIG. 5 is a diagram illustrating various examples in which a linear memory address region is converted into one of 2D memory address regions according to the present invention.

Referring to FIG. 5, when a predetermined linear memory address region is converted into a 2D memory address region, the linear memory address region may be converted into one of variously different 2D memory address regions 510, 520, and 530 which vary depending on two natural numbers that are multiplied to become a linear memory address value. In other words, a larger variety of forms of continuous memory regions with specified sizes may be allocated when compared with a 1D memory address space model. It is possible to allocate a memory region 520 with a horizontal form (a memory region allocation method in a conventional 1D model) as well as a memory region 520 with a vertical form or an X-by-N form.

The above-described expansion of the linear memory address space into N dimensions is possible in a software-based method as well as in hardware-based implementation. In addition, it is possible to expand a 1D memory address space into 2Ds as well as N dimensions, and in this case, a larger variety of memory regions can be allocated and more adjacent free spaces can be combined with the memory region when memory region deallocation is performed.

Figure 6:
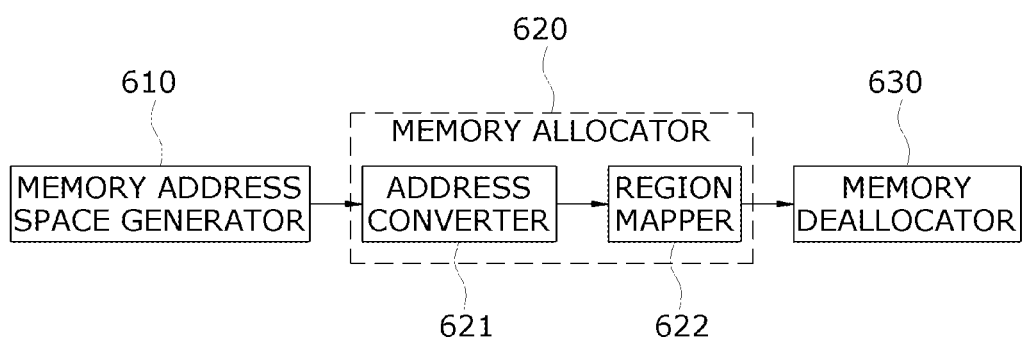
FIG. 6 is a block diagram for describing a dynamic memory management apparatus according to one embodiment of the present invention.

FIG. 6 is a block diagram for describing a dynamic memory management apparatus according to one embodiment of the present invention.

Referring to FIG. 6, the dynamic memory management apparatus largely includes a memory address space generator 610, a memory allocator 620, and a memory deallocator 630.

The memory address space generator 610 determines N natural numbers, the sum of which is the number of bits of a linear memory, as a range of coordinates of an N-dimensional space.

In accordance with an input of information about a linear memory address region which is requested for memory allocation, the memory allocator 620 allocates a specific linear memory address region to a spatial memory address region in the N-dimensional space.

Specifically, the memory address space generator 610 includes an address converter 621 and a region mapper 622. The address converter 621 converts each of addresses of the predetermined linear memory address region into a spatial memory address. In this case, the address converter 621 maps coordinate values consisting of N natural numbers, which are multiplied to become a linear memory address, to a memory address in the N-dimensional space. According to one embodiment, a minimum value address and a maximum value address of the predetermined linear memory address region may be converted into spatial memory addresses.

The region mapper 622 may map the converted predetermined linear memory addresses to spatial memory address regions. According to one embodiment, the predetermined linear memory address region may be mapped to a space region which ranges from the spatial memory address converted from the minimum value address to the spatial memory address converted from the maximum value address.

When the memory region allocated by the memory allocator 620 is deallocated, the memory deallocator 630 manages regions adjacent to the allocated spatial memory address region by combining the regions into free spaces.

FIG. 7 is a flowchart for describing a dynamic memory management method according to one embodiment of the present invention.

Referring to FIG. 7, a dynamic memory management apparatus (hereinafter referred to as an "apparatus") determines N natural numbers, the sum of which is the number of bits of a linear memory (S710). Then, a linear memory address model expands to a spatial memory address model in which the determined natural numbers are a range of coordinates of an N-dimensional space (S720).

When information about a linear memory address region which is requested for memory allocation is input (S730), the apparatus allocates the linear memory address region to a spatial memory address region in the N-dimensional space (S740 to S760).

Specifically, the apparatus converts addresses of the predetermined linear memory address region into spatial memory addresses (S740 and S750). In other words, coordinate values consisting of N natural numbers, which are multiplied to become a linear memory address, are mapped to a memory address in the N-dimensional space. According to one embodiment, a minimum value address and a maximum value address of the predetermined linear memory address region are converted into spatial memory addresses.

The apparatus maps the converted linear memory address to the corresponding spatial memory address region (S760). According to one embodiment, the predetermined linear memory address region is mapped to a space region which ranges from the spatial memory address converted from the minimum value address to the spatial memory address converted from the maximum value address.

In addition, when the memory region is deallocated, the apparatus manages regions adjacent to the allocated spatial memory address region by combining the regions into free spaces (S770).

When data of a variable size is frequently generated and deleted while executing a program using the present invention, the possibility of creating a new free space by combining unused memory regions is superior to those of 1D arrangement-based methods, and hence it is possible to reduce the possibility of memory fragmentation.

The present invention relates to a dynamic memory management method which can reduce memory fragmentation which prevents securing of a free space due to a problem of data arrangement even when there is an actually free memory space.

The present invention relates to a dynamic memory management method capable of reducing memory fragmentation.

It is possible to reduce memory fragmentation problems by using the present invention.

It should be apparent to those skilled in the art that various modifications may be made to the above-described exemplary embodiments of the present invention without departing from the spirit or scope of the invention. Thus, it is intended that the present invention covers all such modifications provided they come within the scope of the appended claims and their equivalents.

What is claimed is:

1. A dynamic memory management method comprising:
generating an N-dimensional memory address space in a predetermined memory; and
mapping a predetermined linear memory address region to an address region in the N-dimensional memory address space according to a memory allocation request, the mapping of the predetermined linear memory address region including:
converting addresses of the predetermined linear memory address region to spatial memory addresses by mapping a coordinate value consisting of N natural numbers, which are multiplied to become the linear memory address, to a spatial memory address in an N-dimensional space, and
mapping the predetermined linear memory address region to a space region in a range of the converted spatial memory addresses.

2. The dynamic memory management method of claim 1, wherein the generating of the N-dimensional memory address space includes generating an N-dimensional memory address space in which coordinates are in a range of N natural numbers, the sum of which is the number of bits of a linear memory.

3. The dynamic memory management method of claim 1, wherein the mapping of the predetermined linear memory address region includes:

converting a minimum value address and a maximum value address of the predetermined linear memory address region to spatial memory addresses; and mapping the predetermined linear memory address region to a space region ranging from the spatial memory address converted from the minimum value address to the spatial memory address converted from the maximum value address.

4. The dynamic memory management method of claim 1, further comprising managing regions adjacent to an allocated spatial memory address region by combining the regions into free spaces when memory deallocation is performed.

5. A dynamic memory management apparatus comprising:

a memory address space generator configured to generate an N-dimensional memory address space in a predetermined memory; and a memory allocator configured to map a predetermined linear memory address region to an address region in the N-dimensional memory address space according to a memory allocation request, the memory allocator including:

an address converter configured to convert addresses of the predetermined linear memory address region to spatial memory addresses by mapping coordinate values consisting of N natural numbers, which are multiplied to become the linear memory address, to a spatial memory address in an N-dimensional space; and a region mapper configured to map the predetermined linear memory address region to a space region in a range of the converted spatial memory addresses.

6. The dynamic memory management apparatus of claim 5, wherein the memory address space generator generates the N-dimensional memory address space in which coordinates are in a range of N natural numbers, the sum of which is the number of bits of a linear memory.

7. The dynamic memory management apparatus of claim 5, wherein the memory allocator includes:

an address converter configured to convert a minimum value address and a maximum value address of the predetermined linear memory address region to spatial memory addresses; and a region mapper configured to map the predetermined linear memory address region to a space region ranging from the spatial memory address converted from the minimum value address to the spatial memory address converted from the maximum value address.

8. The dynamic memory management apparatus of claim 5, further comprising a memory deallocator configured to manage regions adjacent to an allocated spatial memory address region by combining the regions into free spaces when memory deallocation is performed.

* * * * *